United States Patent [19]

Lindegger

[11] 4,277,114
[45] Jul. 7, 1981

[54] ROLLERS INCLUDING LABYRINTH SEALS

[76] Inventor: Eric X. Lindegger, P.O. Box 835, Germiston, 1400, South Africa

[21] Appl. No.: 76,537

[22] Filed: Sep. 18, 1979

[30] Foreign Application Priority Data

Sep. 26, 1978 [ZA] South Africa ............... 78/5451

[51] Int. Cl.³ ................. F16C 13/02; F16C 33/80
[52] U.S. Cl. ............................. 308/20; 277/56; 308/187.1
[58] Field of Search ............ 277/56, 57, 67, 152; 308/20, 36.1, 36.4, 36.5, 187, 187.1, 187.2

[56] References Cited

U.S. PATENT DOCUMENTS 2,587,077 2/1952 Winther .................. 277/57 X
2,740,647 4/1956 Van Pelt ................. 277/56 X
3,909,083 9/1975 Vahle ...................... 308/20

Primary Examiner—Frederick R. Schmidt
Attorney, Agent, or Firm—Ladas & Parry

[57] ABSTRACT

A labyrinth seal element comprises a primary wall extending generally radially outwardly from a central axis, a central opening within said primary wall for receiving a shaft, and a plurality of spaced generally axially extending annular scavenging walls projecting from a side of the primary wall. Each axially extending annular scavenging wall has a radially outer surface which diverges away from the axis as it extends from the primary wall. At least one of the annular scavenging walls partly defines a radially outwardly facing annular groove for inhibiting passage of dirt radially inwardly along the respective side of the primary wall towards the axis.

16 Claims, 3 Drawing Figures

ROLLERS INCLUDING LABYRINTH SEALS

This invention relates to idler rollers for conveyors.

It has been common for manufacturers of seals for conveyors to make a wide range of seals, including labyrinth seals. Labyrinth seals have a pair of relatively rotatable elements with interleaved co-axially extending tubular cylindrical walls for preventing ingress of contaminants such as dirt to bearings. However, under sever conditions these seals are often inadequate as they can often allow liquids or fine, corrosive dust to move progressively towards bearings to be protected.

The present invention aims to overcome certain problems of these labyrinth seals by making use of gravity and centrifugal force to eject contaminants.

The present invention provides a labyrinth seal comprising a pair of seal elements mounted for rotation with respect to one another about an axis, each seal element having a primary wall extending generally radially outwardly from said axis and defining a central opening for receiving a shaft, and also having a plurality of spaced generally axially extending annular scavenging walls extending from the primary wall of that element towards the primary wall of the other element, the axially extending annular scavenging walls of the seal elements being interleaved with one another, wherein the axially extending annular scavenging walls diverge away from the axis as they extend from the primary walls on which they are mounted.

The inclined annular walls will positively arrest the downward flow of contaminant at all points above the axis. Under such circumstances grooves provided partly by the scavenging walls permit contaminants to flow about the axis to be ejected. When the seal is operating and one of its elements is in motion the stationary element would act as described whereas the rotating element would act with centrifugal force to expel or eject any contaminant which may enter the seal.

The primary wall of a first of the seal elements may have a portion shaped to be received within a bearing housing and a further portion extending radially outwardly away from the axis so that it is of generally L-shaped cross-section. The other seal element may have a central tubular portion for location on a shaft and a primary wall extending radially outwardly away from the central tubular portion. The seal element having the portion for location within the bearing housing may then be provided with a pair of lips for engaging the tubular portion of the other seal element, a cavity being formed between the lips for receiving grease to provide a grease seal.

The ends of the annular walls are maintained at minimum clearance with the opposing shield main wall thereby creating a difficult and increasingly tortuous path for inhibiting the entry of contaminant. For example, the annular scavenging walls of each element can be inclined at an angle from 15° to 40° with respect to the shaft axis and terminate at a distance of not greater than about 1 mm from the adjacent surface of the other element.

The invention also extends to a labyrinth seal element comprising a primary wall extending generally radially outwardly from a central axis, a central opening within said primary wall for receiving a shaft, and a plurality of spaced generally axially extending annular scavenging walls projecting from a side of the primary wall, wherein each axially extending annular scavenging wall has a radially outer surface which diverges away from the axis as it extends from the primary wall, at least one of the annular scavenging walls at least partly defining a radially outwardly facing annular groove for inhibiting passage of dirt radially inwardly along the respective side of the primary wall towards the axis.

The axially extending annular scavenging walls may each have a radially inner surface which diverges away from the axis as it extends from the primary wall for facilitating passage of dirt radially outwardly along the respective side of the primary wall.

Also according to the invention, there is provided an idler roller for a conveyor, the roller comprising a tubular shell rotatably mounted on a roller shaft by suitable bearings and having labyrinth seals for inhibiting ingress of dirt and moisture to the bearings of the bearing means, wherein each labyrinth seal comprises a slinger rotatable with the shell and having annular slinger walls extending away from the bearing and diverging away from the shaft and a labyrinth shield mounted on the shaft and having annular shield walls interleaved with the slinger walls, the shield walls diverging away from the shaft as they extend in a direction towards the bearing.

Each bearing means may include a bearing housing having a mounting wall secured to the tube and a housing portion receiving a bearing. The associated slinger may have a primary wall comprising a cylindrical or like portion secured within the housing portion of the bearing housing and a radially inwardly extending portion extending towards the shaft. The annular slinger walls may then project from the radially inwardly extending portion of this primary wall.

The labyrinth shields may each have a tubular portion fitting firmly on the shaft and a frusto-conical or like primary wall extending radially outwardly away from the shaft and terminating close to the mounting wall. The annular shield walls then project from this frusto-conical or like primary wall.

With this arrangement, the labyrinth shield and the slinger both define radially outwardly facing grooves. Thus, if dust or liquid enters the labyrinth seal this material will run in the grooves around the periphery of the seal and thereafter leave the bottom of the seal. When the roller is rotating, the slinger serves to eject the material.

An embodiment of the invention will now be described, by way of example, with reference to the accompanying drawings, in which.

Figure 1:
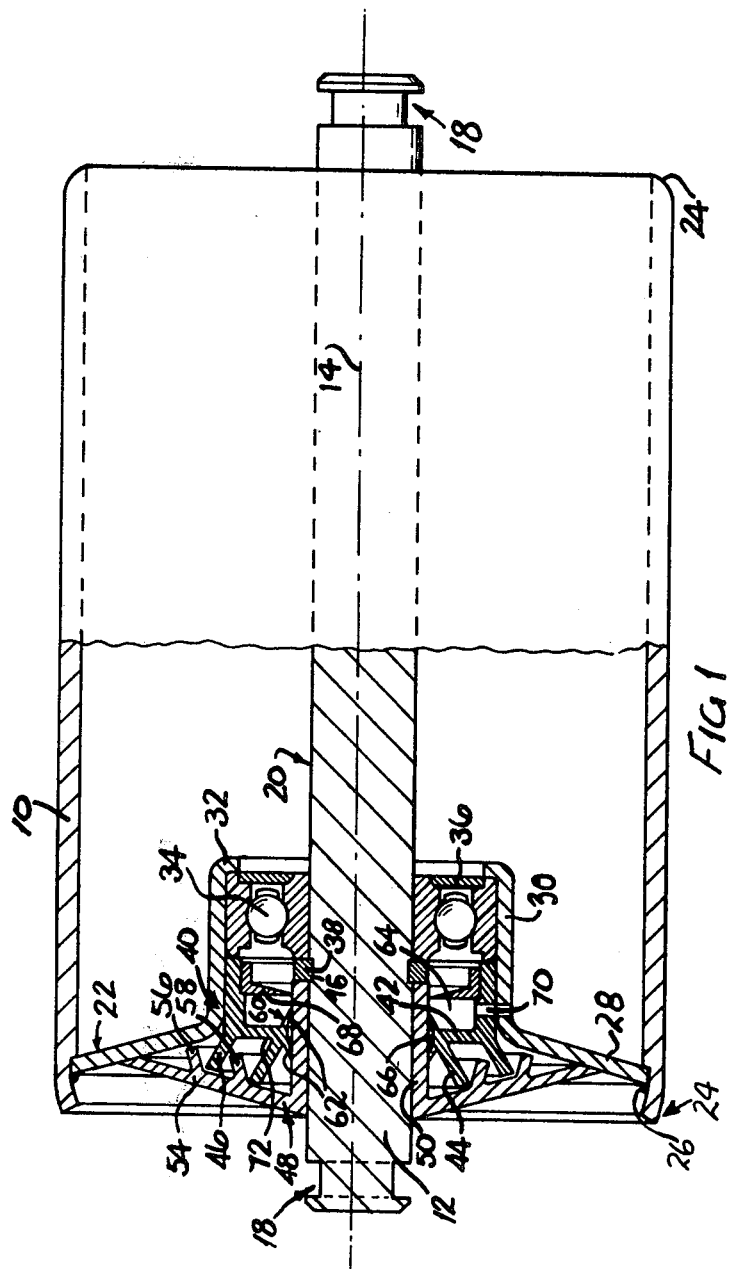
FIG. 1 is a partial cross-section through a conveyor roller.

As shown in the drawing, a conveyor idler roller has a roller shell 10 which is seam-welded and ground so that it is cylindrical with a substantial wall thickness. The tube ends are gripped in a collet whilst machining bearing housing lands for ensuring accuracy of the roller outer periphery in relation to a central shaft 12. The shaft is itself a close tolerance bright mild steel spindle extending along an axis 14 and incorporating circlip grooves 16 as well as double machined end flats 18 for non-spin bracket location. The central part 20 of the shaft is coated with a permanent anti-corrosive medium before it is fitted into the roller.

Precision, deep-drawn heavy duty bearing housings 22 are fitted within the ends of the shell 10 and the ends of the shell are then 'bull-nosed' at 24 under hydraulic pressure to provide liberally radiused ends for belt and personnel protection. A sealing weld 26 is then applied to the tubular shell and bearing housing.

Each bearing housing has a frusto-conical declined mounting wall 28 which merges with a housing portion 30 having an inturned inner edge forming a locating wall 32. In manufacture, once the bearing housings have been fixed in the shell, the resulting assembly is balanced and then coated with permanent anti-corrosive medium.

High density, single row, deep groove ball bearings 34 provided with metal-reinforced nitrile seals 36 are fitted into the housing portion 30 of each bearing housing 22, being located in position by the locating wall 32. The bearings are secured in place by circlips 38 located in the grooves 16.

A labyrinth slinger 40 has an annular L-shaped cross-section primary wall 42 sealingly fitted into the outer end of the housing portion 30 of each bearing housing 22 and extending radially inwardly towards the shaft 12. Annular slinger walls 44 and 46 project from the primary wall of the slinger in a direction generally axially of the shaft 12. The walls 44 and 46 extend in a direction away from the bearing 34 and diverge away from the shaft at an angle of about 30 degrees to the axis of the shaft.

Labyrinth shields 48 are provided with tubular portions 50 which fit securely on the shaft 12 and which are located in place by the circlips 38 in the grooves 16. A frusto-conical primary wall 54 extends from the outer end of each portion 50 to a location close to the mounting wall 22. Annular shield walls 56 and 58 project from the frusto-conical wall 54 in a direction generally axially of the shaft 12 towards the adjacent bearing 34 and diverge away from the shaft 12 at an angle of about 30 degrees to the shaft axis. The walls 56 and 58 are interleaved with the walls 44 and 46. Annular, radially outwardly facing grooves are thus provided by the labyrinth slinger and labyrinth shield.

Each of the walls 44, 46, 56 and 58 thus has radially inner and outer frusto-conical surfaces and each of the walls 44, 56 and 58 defines part of a V-shaped groove 72 facing radially outwardly away from the shaft 12.

The labyrinth slinger and labyrinth shield are dimensioned and shaped so that the spacing between the ends of the walls 44, 46, 56 and 58 and adjacent surfaces of the slinger, shield or housing is no greater than, for example, 0,1 mm.

The slinger 40 provides a radially inner seal 60 having a pair of shield-engaging lips 62 which engage the tubular portion 50 of the shield. As the slinger is located in each housing portion 30 behind the respective bearing 34, it serves to provide a grease reservoir 64 next to the bearing, the reservoir being bordered by the inner of the lips 62. The reservoir is filled with grease for lubricating the bearings. In addition, an annular cavity 66 is formed between the lips 62 of the seal 60 and is filled with grease to inhibit ingress of dust or moisture into the reservoir 64. An auxiliary seal 68 may be provided in the reservoir and extend between the slinger and shield, as shown, and form a breather chamber on the slinger side of the seal 68.

Breather holes 70 are provided in each bearing housing and slinger on diametrically opposed sides of the shaft 12 to protect the seals against pressure differences resulting from climatic changes and temperature variations. These breather holes communicate only with the sealed interior of the roller.

This method of incorporating a breather ensures that no contaminant is pumped in to the inner chamber, from where it could attack the bearing from the inside or where it would necessitate the incorporation of highly sophisticated additional sealing with resultant increased costs and power requirements.

In the absence of an auxiliary seal, the boss length of the inner shield could be shortened thereby enabling the bearing to be moved outwardly and closer to the end of the tube, thus shortening the housing as well as reducing the shaft or centre component bending moment.

Where certain extreme temperature changes are not encountered, it may not be necessary to incorporate the auxiliary seal 68 as the entire inner chamber could then be used as a substantial lubricant reservoir.

The labyrinth slinger may be manufactured of any suitable non-corrosive material and, before the labyrinth shields are fitted to the roller, may be given a liberal application of a permanent non-corrosive medium together with the remainder of the roller. The labyrinth shield can also be manufactured of a non-corrosive material but this should be a high impact-resistant material to withstand all normal shocks to which idler rollers are subjected.

In use, the labyrinth created by the slinger and labyrinth shield serves to prevent the ingress of dust or liquid moving down the outer face of the bearing housing and entering the bearing housing. While the roller is stationary, this material is arrested in the bottom of the groove bordered by the annular slinger wall 46 and the bearing housing 22, runs around the periphery of the slinger within this groove and leaves the bottom of the labyrinth seal, for example by dropping off the slinger and being deflected by the annular wall 56 of the outer shield and passing between the shield and the bearing housing.

When the roller is rotating, the annular wall 46 of the slinger actively ejects material outwardly from the seal. Where, in the case of moisture, the material would normally lodge on the inner face of the annular wall 56 of the shield 48, the moisture runs round the shield, aided by air currents, and is again discharged from the lower part of the seal.

In the case of dust reaching the slinger wall 46 while the roller is rotating, the dust is thrown outwardly and either passes the inner face of the wall 56 or is forced to the V-shaped groove at the outer face of the wall 56 so that it travels along this groove. In either case, the dust is discharged through the aperture between the shield 48 and the housing 28. The annular slinger wall 44 of the labyrinth slinger is a security wall to arrest blast particles which might get past the previous walls. These particles are ejected by the inner wall and are thrown past the outer walls so that they eventually escape through the aperture between the shield and the bearing housing 28.

Figure 2:
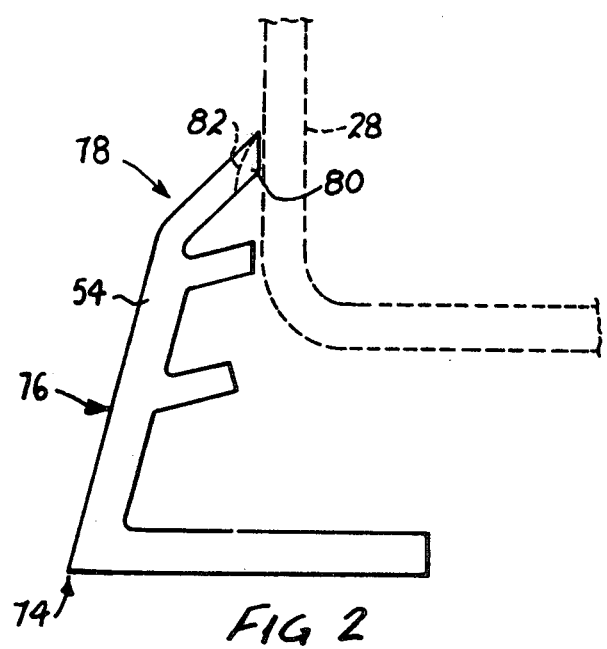
FIG. 2 is a partial cross-section through a seal element.

FIG. 2 shows a shield 74 for use with a bearing housing having an inclined mounting wall 28 (shown in chain lines). The shield 74 is used in the same manner as that of FIG. 1 but the wall 54 of the shield has been deformed towards the wall 28 so that it lies within, for example, 1 mm of the wall. The wall 54 thus has a radially inner frusto-conical portion 76 and a radially outer frusto-conical portion 78 at a relatively small included angle to the shaft 12. The part of the portion 78 closest to the wall 26 may contain three equally angularly spaced notches 80 formed by cutting the shield along chain lines 82. This is particularly useful for the handling of slurries as it facilitates drainage from the shield.

Figure 3:
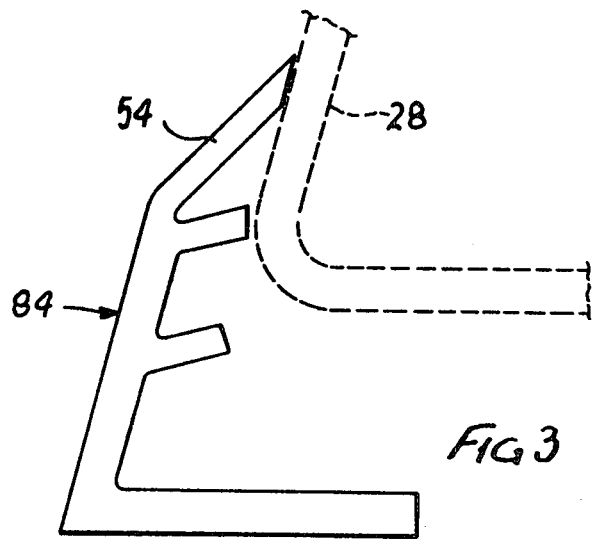
FIG. 3 is a partial cross-section through a further seal element.

In FIG. 3, a shield 84 for use with a square face mounting wall 28 is shown. The shield is similar to that of FIG. 2 but the radially outer part of the wall 54 is relatively short compared with that of FIG. 2 so that it again lies within, for example, 1 mm of the face of the wall 28.

Whichever form of shield or slinger is used, the slinger wall 44 or 46 or shield wall 56 or 58 will serve as an efficient scavenging wall for inhibiting passage of contaminants to the bearing and thus protecting the bearing.

I claim:

1. A roller for a conveyor, the roller comprising:
   a roller shaft;
   a tubular shell;
   a plurality of bearing means, each including a bearing housing having a mounting wall secured to said shell and a housing portion receiving a respective bearing, said tubular shell being rotatably mounted on said roller shaft by said plurality of bearing means; and labyrinth seals associated with said plurality of bearing means for inhibiting ingress of dirt and moisture to said bearings, wherein each labyrinth seal comprises a slinger rotatable with the shell and having annular slinger walls extending away from each associated bearing and diverging away from said shaft and a labyrinth shield mounted on said shaft and having annular shield walls interleaved with said slinger walls, said labyrinth shields each having a tubular portion fitting firmly on said shaft and a radially outwardly extending wall extending away from said shaft and having an outer edge terminating close to said mounting wall of each associated bearing means, said shield walls diverging away from said shaft as they extend in a direction towards said mounting wall from said radially outwardly extending wall.

2. A roller according to claim 1, wherein each slinger has a primary wall comprising a portion secured within said housing portion of the bearing housing of each associated bearing means and a radially inwardly extending portion extending towards said shaft, said annular slinger walls projecting from said radially inwardly extending portion of said primary wall of said slinger.

3. A roller according to claim 2, wherein each slinger has radially inner sealing lips engaging said tubular portion of each associated labyrinth shield.

4. A roller according to claim 3, wherein each slinger is provided with a pair of said sealing lips for engaging said tubular portion of each associated labyrinth shield, a cavity being formed between said lips receiving grease to provide a grease seal.

5. A roller according to claim 2, wherein said portion of each said slinger secured within said housing portion of each associated bearing means contains a breather opening communicating with an opening in said housing portion and in alignment therewith.

6. A roller according to claim 1, wherein said annular walls of said slinger and shield are each inclined at an angle of from 15° to 40° with respect to said shaft axis, and terminate at a distance of not greater than about 1 mm from an adjacent surface.

7. A roller according to claim 1, wherein said radially outwardly extending wall of said labyrinth shield is a frustoconical wall.

8. A roller according to claim 1, wherein said radially outwardly extending wall of said labyrinth shield has a frustoconical inner part and a frusto-conical outer part inclined at a smaller angle to said shaft than said inner part.

9. A roller for a conveyor, the roller comprising:
   a tubular shell rotatably mounted on a roller shaft by suitable bearing means including bearings;
   and labyrinth seals adjacent said bearing means for inhibiting ingress of dirt and moisture to the bearings, each labyrinth seal comprising a slinger rotatable with said shell and having annular slinger walls extending away from said bearing of the adjacent bearing means and diverging away from said shaft, and a labyrinth shield mounted on said shaft and having annular shield walls interleaved with said slinger walls and diverging away from said shaft as they extend in a direction towards the bearing of each associated bearing means;
   wherein the labyrinth shields each have a tubular portion fitting firmly on said shaft, and wherein said slinger of each labyrinth seal is provided with a pair of sealing lips for engaging said tubular portion of said labyrinth shield of that labyrinth seal, a cavity being formed between said lips and receiving grease to provide a grease seal.

10. A roller according to claim 9, wherein each slinger has a primary wall comprising a portion secured within a housing portion of each associated bearing means and a radially inwardly extending portion extending towards said shaft, said sealing lips of each slinger being provided at a radially inner end of said radially inwardly extending portion.

11. A roller according to claim 10, wherein said annular slinger walls of each slinger project from said radially inwardly extending portion of said primary wall of said slinger.

12. A roller according to claim 10, wherein said annular walls of said slinger and shield are inclined at an angle of from 15° to 40° with respect to said shaft axis and have free ends terminating at a distance of not greater than about 1 mm from an adjacent surface.

13. A roller for a conveyor, the roller comprising:
   a tubular shell;
   a roller shaft;
   a plurality of bearing means each including a bearing housing having a mounting wall secured to said shell and a housing portion receiving a respective bearing, said shell being rotatably mounted on a roller shaft by said bearing means;
   slingers each associated with a respective bearing means, each slinger being rotatable with said shell and having: a primary wall comprising a portion secured within said housing portion of said bearing housing, a radially inwardly extending portion extending towards said shaft, and annular slinger walls extending away from each adjacent bearing and diverging away from said shaft; and
   labyrinth shields each associated with respective bearing means and each having a tubular portion fitting firmly on said shaft, an outer wall extending radially outwardly away from said shaft and diverging towards said mounting wall, and annular shield walls projecting from said outer wall towards an adjacent slinger and interleaved with said slinger walls of said adjacent slinger, said shield walls diverging away from said shaft as they extend in a direction towards said mounting wall; said annular walls of each slinger being inclined at an angle of from 15° to 40° with respect to said shaft axis and having ends terminating at a distance of not greater than about 1 mm from each adjacent shield.

14. A roller according to claim 13, wherein said annular walls of each slinger have their free ends terminating at a distance of not greater than about 1 mm from said outer wall of each adjacent shield.

15. A roller according to claim 13, wherein each slinger has radially inner sealing lips engaging said tubular portion of each associated labyrinth shield.

16. A roller according to claim 15, wherein each slinger is provided with a pair of said lips for engaging said tubular portion or each associated labyrinth shield, a cavity being formed between said lips and receiving grease to provide a grease seal.

* * * * *